United States Patent [19]
Klinger et al.

[11] Patent Number: 5,958,473
[45] Date of Patent: Sep. 28, 1999

[54] HIGH-PROTEIN CAROB GERM FRACTION

[75] Inventors: Josef Klinger, Tagerwilen; Max Sprenger, Bischosell, both of Switzerland

[73] Assignee: Rhodia Chimie, Courbevoie, France

[21] Appl. No.: 08/979,804

[22] Filed: Nov. 26, 1997

Related U.S. Application Data

[62] Division of application No. 08/455,743, May 31, 1995, abandoned.

[30] Foreign Application Priority Data

Mar. 6, 1994 [FR] France ................................. 94 06803

[51] Int. Cl.$^6$ ........................................................ A23G 1/02
[52] U.S. Cl. ................................. 426/44; 426/49; 426/629
[58] Field of Search ................................. 426/44, 49, 48, 426/615, 629, 573

[56] References Cited

U.S. PATENT DOCUMENTS 5,476,773  12/1995  Heyland et al. ....................... 426/44 X

OTHER PUBLICATIONS

73–209944 (15) WPIDS, Nippon Flour Mills Co Ltd. abstracting JP 73011030B, Aug. 1993.

94–322820 (40) WPIDS, Lander, abstracting NL 9300536 A, Nov. 1928.

90(07): G0017 FSTA, Del Re–Jimenez et al., abstracting Food Hydrocolloids, 1989, 3(2) 149–156.

Altschul, A.M., Processed Plant Protein Foodstuffs Academic Press, New York, 1958, p. 115.

*Primary Examiner*—Leslie Wong
*Attorney, Agent, or Firm*—Andrew M. Solomon

[57] ABSTRACT

A treated fraction of a high-protein carob germ, with a content of protease inhibitor reduced by at least 75%, relative to its initial natural content, a water content of less than 5%, and a protein content at least equal to 50%, relative to the total weight of the fraction. Also a process for preparing the fraction and the use of this fraction as food additive.

5 Claims, No Drawings

HIGH-PROTEIN CAROB GERM FRACTION

This Application is a Divisional Application of application Ser. No.: 08/455,743 filed May 31, 1995, now abandoned.

The present invention relates to the development of a thermally treated fraction of the germ of the carob seed, having a very high protein content, and capable of being used in human nutrition.

TECHNICAL BACKGROUND OF THE INVENTION

The current tastes of consumers are increasingly oriented towards a low-fat diet. To this end, there has been developed, in the last 20 years, a wide variety of products for everyday consumption based on direct or reversed emulsion of the margarine, salad dressing or mayonnaise type and the like in which the concentration of fat is considerably reduced in favour of that of water. This has involved the parallel development of stabilizing and/or emulsifying systems capable of conferring the required stability on these emulsions.

Among the emulsifying agents conventionally used, there may be mentioned more particularly egg protein extracts, sodium caseinates and powdered skim milks.

All these agents are characterized by a high protein content which probably improves their emulsifying behaviour. For this reason, their use is very common.

This has led to the more recent development of new emulsifying agents, of non-animal origin and having an equivalent or even superior emulsifying behaviour.

BRIEF SUMMARY OF THE INVENTION

The object of the present invention is precisely to propose a new composition, of non-animal origin, of low cost, of sweet taste and having a protein content such that it confers thereto effective emulsifying properties.

DETAILED DESCRIPTION OF THE INVENTION

More particularly, the present invention proposes a fraction (or concentrate) of carob seed germ which was unexpectedly found to satisfy all these requirements.

The carob tree produces a fruit. This fruit consists of two parts, the pod and the seed. The carob seed, and more particularly the endosperm fraction of this seed, is already widely valorized in the food industry under the name "carob gum". Adjacent to this endosperm fraction is the germ which is a by-product obtained in large quantities during the isolation of carob gum. This germ indeed has a high content of protease inhibitor (such as trypsin). This high content can raise major nutritional problems and therefore prevents a generalized use of this compound in human nutrition. Another point which poses a problem in the possible uses of carob germ, generally in powdered form, is the high water content of this powder which renders it highly susceptible to rancidity and therefore greatly limits its storage stability. These two points are therefore detrimental to the valorization of carob germ meal. Yet, this germ has a substantial protein concentration which is capable of being valorized as functional protein.

The difficulties encountered and resolved according to the present invention also lie in the preservation of the high protein content during the said treatment of the germ. The decrease of the content of protease inhibitors and the reduction of the water content of the germ should not be performed at the expense of the protein content.

The present invention therefore relates to a carob germ fraction which does not exhibit the above disadvantages, and which is appropriate for its valorization in the food industry. The present invention also relates to the development of a process for the treatment of carob germ resulting in a germ fraction having the desired properties.

The present invention indeed relates to a high-protein carob germ fraction, characterized in that it has a content of protease inhibitor reduced by at least 75%, preferably by at least 85%, relative to its initial natural content, a water content of less than 5%, preferably of less than 4% and a protein content at least equal to 50%, preferably at least equal to 55%, relative to the total weight of the fraction.

The present invention also relates to a process for preparing a high-protein carob germ fraction, characterized in that it comprises a treatment of carob seed germs, the said seeds being previously freed of their endosperm fractions, the said treatment of the germs making it possible to decrease their protease inhibitor content and their water content to the desired values, and in that it produces an edible carob germ fraction (or concentrate) having a protein content at least equal to 50%, preferably 55% by eight/weight.

According to a particular embodiment of the invention, the germ is treated thermally at a temperature of between about 180 and 210° C. with dry air. A microwave oven can also be used.

The lower the temperature for thermal treatment, the longer the duration of this treatment. It is for example 4 to 8 minutes at 205° C.

The germ can be thermally treated as such or after having been ground in the form of a powder. It is recommended to grind the germ after its thermal treatment.

The moisture content of the treated carob germs should be less than or equal to 5%, preferably less than or equal to 4%, in order to avoid the fatty or oily substances becoming rancid during a storage period is normally used (at least a few months and generally less than 3 years).

Unexpectedly, the carob germ concentrate obtained at the end of the process according to the invention was found to have emulsifying properties comparable and even superior, in certain cases, to those of the conventional additives discussed earlier.

In addition to the proteins, the carob germ fraction according to the invention contains predominantly lipid components and carbohydrates. The lipid content varies between 5 and 10% by weight. As for the carbohydrates, their quantities fluctuate between 20 and 30% by weight. The carob germ fraction according to the invention can be used alone or mixed with one or more conventional emulsifying agents to stabilize and/or emulsify reversed or direct emulsions or even foams.

As regards the emulsions or foams incorporating the said extract according to the invention, they may be any emulsions developed in the food industry.

Of course, the quantity of germ fraction incorporated into the emulsion or foam is a function of the nature of the elements constituting them and the desired emulsion. It is within the capability of a person skilled in the art to determine the suitable and corresponding quantity of fraction to be used.

In addition to its effective emulsifying power, the carob germ extract advantageously confers on the emulsion textural qualities approaching those of a fat. This is an important advantage in the eyes of the consumer who is seeking to find, in the taste and texture of the low-fat foods which he consumes, the organoleptic qualities of the original product, that is to say with non-reduced fat content.

The present invention also relates to the use, in general, of the carob germ fraction according to the invention, and, more particularly, to its use as stabilizing and/or emulsifying agent in direct or reversed emulsion and in food mousses, more particularly in mayonnaises, margarines, spreads and salad dressings.

As a guide, an emulsion of this type contains 0.5–1.5 parts by weight of fraction according to the invention per 100 parts by weight of fat phases used.

Unless otherwise indicated, the parts and percentages are by weight.

The non-limitative examples presented below of the present invention will make it possible to highlight other advantages thereof.

EXAMPLE 1
Process for the Preparation of a Carob Germ Fraction

Pods of carob seeds are carbonized with sulphuric acid at high temperature and the treated pods are then neutralized. The endosperms and the germs are separated by mechanical means and the germ is treated at 205° C. for 6 minutes in a hot-air oven and is then cooled to room temperature, ground, sieved and packaged.

According to this process, 20% of protein-enriched carob germ is obtained based on the weight of the seed.

Chemical characterization of this fraction shows that it consists of:

|  | % by weight (treated germ) | % by weight (untreated germ) |
| --- | --- | --- |
| Water | 4 | 7–9 |
| Proteins | 56 | 50–52 |
| Lipids | 7.2 | 6–8 |
| Carbohydrates | 26.2 | 25–27 |
| Ash | 6.6 | 6–7 |

EXAMPLE 2
Comparison of the Emulsifying Power of a Carob Germ Fraction Prepared According to the Procedure of Example 1 with Those of Conventional Emulsifying Agents The emulsifying power of the germ fraction is evaluated according to the method described by J. E. Kinsella (J. Am. Oil Chemists Soc. 56 : 242- ; 1979) and is compared to that of other proteins.

The results are presented in Table 1 below.

TABLE I

| EMULSIFYING AGENT TESTED | EMULSIFYING POWER (g of emulsifying agent/100 g of oil) |
| --- | --- |
| egg yolk proteins | 2.5 |
| sodium caseinates | 0.5 |
| powdered skim milk | 0.75 |
| demineralized solids | 0.7 |
| carob seed germ extract | 0.75 |

As it can be seen in Table I above, the carob seed germ fraction has an emulsifying power similar to that of powdered skim milk.

EXAMPLE 3
Formulations of Food Emulsions Incorporating a Carob Seed Germ Fraction Prepared According to the Procedure of Example 1.

Formulation of a mayonnaise (hot process)

| COMPOSITION | QUANTITIES % by weight |
| --- | --- |
| Water | 35.4 |
| Sugar | 3.0 |
| Starch + vegetable proteins + carob gum/guar gum | 3.46 |
| Carob germ extract | 0.14 |
| Oil | 50.00 |
| Vinegar 10° | 5.0 |
| Mustard | 2.0 |
| Salt | 1.0 |
|  | 100 |

The mayonnaise is prepared as follows: The sugar, the stabilizing system and the carob germ fraction are added to the premix containing the starch, the vegetable proteins and the carob and guar gums. The mixture is heated at 85° C. for at least 1 min and oil, emulsifier, vinegar and mustard are added and the mixture is passed through a colloid grinder for 1 or 2 min.

The mayonnaise stabilized by a carob germ extract according to the invention has a creamy and non-sticky texture quite comparable to the texture of a non-industrial mayonnaise.

Formulation of a low-fat spread

| COMPOSITION | QUANTITY % by weight |
| --- | --- |
| Water | 59.605 |
| Mixture of vegetable oils | 37.000 |
| Emulsifiers (E471/E474:7/3 by weight) | 1.000 |
| Lactic acid at 50% | 0.300 |
| Potassium sorbate | 0.150 |
| Salt | 1.000 |
| Sweetener | 0.040 |
| Beta-carotene | 0.005 |
| guar gum/xanthan gum + vegetable proteins | 0.7 |
| Carob germ fraction of Example 1 | 0.2 |

E471: mono- and diglycerides of food fatty acids E472: mono- and diglycerides of food fatty acids esterified with one of the following acids: acetic, lactic, citric, tartaric, mono-acetyltartaric and diacetyltartaric acids.

To prepare this spread, the procedure is carried out as follows:

Two fractions are prepared: a first oily fraction comprising the mixture of vegetable fat, the emulsifiers, the carotene, the butter and the flavouring and a second water-soluble fraction containing the other ingredients.

The fats are melted in a water bath at 70° C., then mixed.

The aqueous phase, containing additional components in solution and, optionally, stabilizers in dispersion, is also maintained at 80° C. with stirring for at least 10 minutes.

The aqueous phase is then slowly added (about 30 minutes) to the fatty phase, with vigorous stirring.

When the emulsion is complete, it is passed over a scraped-surface exchanger at a temperature of 25–30° C., then at 6 to 4° C.

It is important to cool suddenly (thermal quenching) in order to reverse the phases.

Compared with a spread formulation not incorporating a carob germ fraction according to the invention, the composition containing this fraction tastes better in the mouth and is more easily spreadable.

What is claimed is:

1. A process for preparing a carob germ fraction consisting essentially of thermally treating carob seed germs at a suitable temperature and for a suitable period of time such that the resulting product has a content of protease inhibitor reduced by at least 85% relative to its initial natural content, a water content of less than 4%, and a protein content of at least equal to 55%, relative to the total weight of the fraction.

2. A process according to claim 1, wherein the germs are treated at between about 180° C. and about 210° C. with dry air or by microwave radiation.

3. A food product comprising a high protein carob germ fraction prepared by the process of claim 1.

4. A process for emulsifying a food product having a fatty phase, comprising the step of adding to said food product a high protein carob germ fraction prepared by the process of claim 1, in an amount of about 0.5 to about 1.5 parts by weight per one hundred parts by weight of the fatty phase of said emulsion.

5. A process according to claim 4, wherein the food product is selected from the group consisting of mayonnaise, margarine, spread, and salad dressing.

* * * * *